United States Patent
Klaghofer et al.

(10) Patent No.: US 7,315,537 B2
(45) Date of Patent: Jan. 1, 2008

(54) METHOD FOR THE TRANSMISSION OF DATA IN A PACKET-ORIENTED DATA NETWORK

(75) Inventors: Karl Klaghofer, München (DE); Harald Müller, Gilching (DE); Jürgen Totzke, Poing (DE); Gerald Volkmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 658 days.

(21) Appl. No.: 10/490,579

(22) PCT Filed: Sep. 10, 2002

(86) PCT No.: PCT/DE02/03356

§ 371 (c)(1),
(2), (4) Date: Mar. 19, 2004

(87) PCT Pub. No.: WO03/028335

PCT Pub. Date: Apr. 3, 2003

(65) Prior Publication Data

US 2004/0246979 A1 Dec. 9, 2004

(30) Foreign Application Priority Data

Sep. 25, 2001 (DE) ................. 101 47 146

(51) Int. Cl.
*G06F 15/173* (2006.01)
*G06F 1/24* (2006.01)

(52) U.S. Cl. ............... 370/352; 370/354; 370/401; 713/161; 713/170

(58) Field of Classification Search ........ 370/352–360; 709/223–225; 713/201, 161, 165, 166, 168, 713/170

See application file for complete search history.

(56) References Cited

U.S. PATENT DOCUMENTS

| 5,778,174 | A | * | 7/1998 | Cain | ............................ 726/11 |
| 5,958,015 | A | | 9/1999 | Dascalu | |
| 6,298,380 | B1 | * | 10/2001 | Coile et al. | ................. 709/227 |
| 6,304,967 | B1 | * | 10/2001 | Braddy | ........................ 713/150 |
| 6,321,267 | B1 | * | 11/2001 | Donaldson | .................. 709/229 |
| 6,324,648 | B1 | * | 11/2001 | Grantges, Jr. | ................ 726/12 |
| 6,598,081 | B1 | * | 7/2003 | Coile et al. | ................. 709/227 |
| 2003/0154410 | A1 | * | 8/2003 | Drell | .......................... 713/201 |
| 2004/0187033 | A1 | * | 9/2004 | Wang | ......................... 713/201 |
| 2005/0125532 | A1 | * | 6/2005 | Kimchi | ...................... 709/225 |

FOREIGN PATENT DOCUMENTS

DE 197 41 239 C2 5/1998
WO WO 98/34385 8/1998

OTHER PUBLICATIONS

Christoph Rensing, Utz Rodig, Ralf Ackerman, Lars Wolf, Ralf Steinmetz, "VDMFA, eine verteilte dynamische Firewallarchitektur fur Multimedia-Dienste", Mar. 31, 1999, XP-002184608, pp. 1-14.
Christoph Donnemiller, "IP lernt dazu", Nachrichtentechnik Elektronik, VEB Verlag Technik, Berlin, Band 49, Nr. 7/8, Aug. 1999, pp. 30-31.

* cited by examiner

*Primary Examiner*—Binh K. Tieu

(57) ABSTRACT

Method for the transmission of data between at least two communication devices, connected to each other by means of a data network, whereby information data for a security device, connected to the second communication device, for protection against an unauthorized access to the communication device, is transmitted by means of the security device and audio and video data is transmitted directly by by-passing the security device.

11 Claims, 2 Drawing Sheets

METHOD FOR THE TRANSMISSION OF DATA IN A PACKET-ORIENTED DATA NETWORK

CROSS REFERENCE TO RELATED APPLICATIONS

This application is the U.S. National Stage of International Application No. PCT/DE02/03356, filed Sep. 10, 2002 and claims the benefit thereof. The International Application claims the benefits of German application No. 10147146.7 DE filed Sep. 25, 2001, both of the applications are incorporated by reference herein in their entirety.

FIELD OF INVENTION

The invention relates to a method for packet-oriented transmission of data between at least two communication devices, in accordance with the preamble of Patent claim 1, and to a proxy.

BACKGROUND OF INVENTION

Communication links for voice transmission have previously been predominantly circuit oriented. For this purpose a physical connection is provided for signal transmission between two communication end points and is reserved for the entire duration of the connection. This is also referred to as circuit-oriented transmission, static routing or through switching.

With the advent of packet-oriented data networks (packet switching) such as the Internet for example, reduced-cost communication compared to circuit switching is being provided in the fixed network area. The particular reason for this is the efficient capacity utilization of a connection, since, by contrast with circuit switching, packet switching does not occupy the physical transmission medium for the entire duration of the connection. The data to be transported is subdivided into individual data packets, with each data packet being given an address code identifying it to the recipient of the transmission. The individual data packets are them transmitted independently of each other—they can even use different transmission paths. The principle of packet switching is defined in various standards, the best known standard is described in ITU-T Recommendation X.25.

VoFR (Voice over Frame Relay) or VoIP (Voice over IP) are known for example as packet-oriented methods of transmission for voice. In these methods the data is digitized, undergoes source coding and preferably channel coding and is divided into data packets which are then transferred over the Internet. The data to be transmitted can be composed of the voice and/or video data and of information data and serve for example for transmission of video conferences over the Internet.

To allow transmission of voice and/or video data and information data within the framework of a multimedia conference over the Internet international standards have been created. These standards include the H.323 standard or the SIP standard which use protocols known from the Internet, such as UDP (User Data Protocol) and RTP (Real-Time Protocol).

Increasingly security facilities to protect against unauthorized access to communication devices are provided. These are devices which prevent or render more difficult unauthorized access to data and/or prevent computer viruses being received by filtering out data containing computer viruses. These security devices are also frequently known as firewalls. A firewall in such cases is set up at a point in the data network at which a protected internal network, for example an Intranet, connects to the Internet. All data arriving from the Internet or going out from the internal network pass through the firewall. This gives the firewall the opportunity of ensuring that this data traffic is reliable, i.e. that it accords with the security policy of the relevant site. A firewall thus corresponds to a checkpoint through which the entire incoming and outgoing data traffic must pass. The bundling of the security measures from this one checkpoint is significantly more efficient than spreading the security-Orelevant decisions and technologies across the organization and covering all weakpoints section by section.

The IP addresses needed for transmission of data will only be assigned dynamically by the relevant Internet Service Providers (ISP), which means that, before a connection is established over the Internet the IP address must first be exchanged. A firewall arranged between the data networks is however as a rule designed for the detection of static IP addresses.

For each connection the port numbers of the firewall must be newly defined, which can only apply for the duration of an individual connection. These dynamically determined port numbers give rise to problems in processing of data by the firewall device which as a rule is set up to detect statically defined port numbers. For reasons of security, operators and administrators of current firewall systems may not as a rule make any changes to the configuration to let such data pass through the firewall, since otherwise the risk of unauthorized access to the communication devices increases. This is why for example a multimedia conference using a VoIP connection with an intermediate firewall proves to be extremely problematical.

Conventionally existing firewalls are expanded by additional devices which recognize multimedia data and direct it through the firewall. However this requires an existing firewall system to be replaced by new one which has to be configured completely again and can also have new security gaps.

SUMMARY OF INVENTION

The object of the invention is thus to develop a method of the generic type in such a way that data at a security device located in the data network will be transmitted through this security device while retaining an existing security configuration. A further object of the invention is to provide a proxy for executing the method.

This object is achieved as regards the method by the features of Patent claim 1 and as regards the device by the features of Patent claims 10 and 11.

One major feature of the invention is that the information data for protecting against unauthorized access to the communication devices is transmitted to the security device and the voice and/or video data is transmitted to bypass the security device. A major advantage of the methods lies in the fact that no changes have to be made to the configuration of the existing firewall system to let us all data pass through the firewall. A further advantage of the method lies in the fact that the voice and/or a video data does not have to be subjected to any security checking, which relieves the firewall of the load of analyzing this data. It proves to be extremely advantageous that although a majority of the data belonging to the multimedia data bypasses the firewall, no allowance has to be made for restrictions for protecting against unauthorized access to the communication device.

In a preferred embodiment the information data is selected from the voice and/or video data using a selection device located within a first proxy. This means that only information data is then transmitted from the first proxy to the firewall and subjected to security checking there. One of the checks conducted here is whether this data is data which will enable unauthorized access to communication equipment or whether this data might contain computer viruses. The security-checked data is then transmitted to an assembly device located within a second proxy. The voice and/or video data on the other hand is transmitted directly from the first proxy to the assembly device. The data is then reassembled into the original multimedia data. To carry out this reassembly the system refers back to data contained in an additional field (header) of the individual data packets. The headers contain general protocol data through which the original order of the data can be generated. After reassembly the data is transmitted to the communication device.

In a preferred embodiment the data network is set up as a communication system in accordance with the H.323 standard for transmission of VoIP data. The H.323 standard specifies a standard for realtime communication and describes the transport of data over IP-based networks. In a further embodiment the data network is set up as a multimedia communication system in accordance with the SIP standard.

Preferably the data is distributed in accordance with a real-time protocol (RTP) method over a number of IP packets. Time stamps with the time of origination and also sequence information are incorporated into the headers of these packets. This allows the receiving device to assemble packets not only in the right order but also with the timing synchronized. In addition RTP defines the encoding of audio, video and data in accordance with the number of codecs. This involves coding and decoding procedures are which defined by the ITU for analog and digital encryption of audio, video and data in telephone networks.

In a preferred embodiment, for safeguarding of the data channels between the proxies and the firewall there is access to authenticated channels in order to close these last "loopholes" for potential hacker attacks. Access to authenticated channels is exclusively reserved to authorized subscribers.

Alternatively it is also possible to resort to encryption to safeguard the information data.

To exclude possible "attacks" on the proxies using File Transfer Protocol (FTP), Telnet or Ping for example, the proxies are designed with an IP packet filter functionality. A packet filter at IP level only lets IP data packets past which satisfy specific predefined criteria. These can include the direction, the sender address, the receiver address, the source port, the destination port etc.

BRIEF DESCRIPTION OF DRAWINGS

Further advantages are produced by the subclaims as well as the descriptions of the preferred exemplary embodiments below which are explained in more detail on the basis of the diagrams. The diagrams show:

DETAILED DESCRIPTION OF INVENTION

Figure 1:
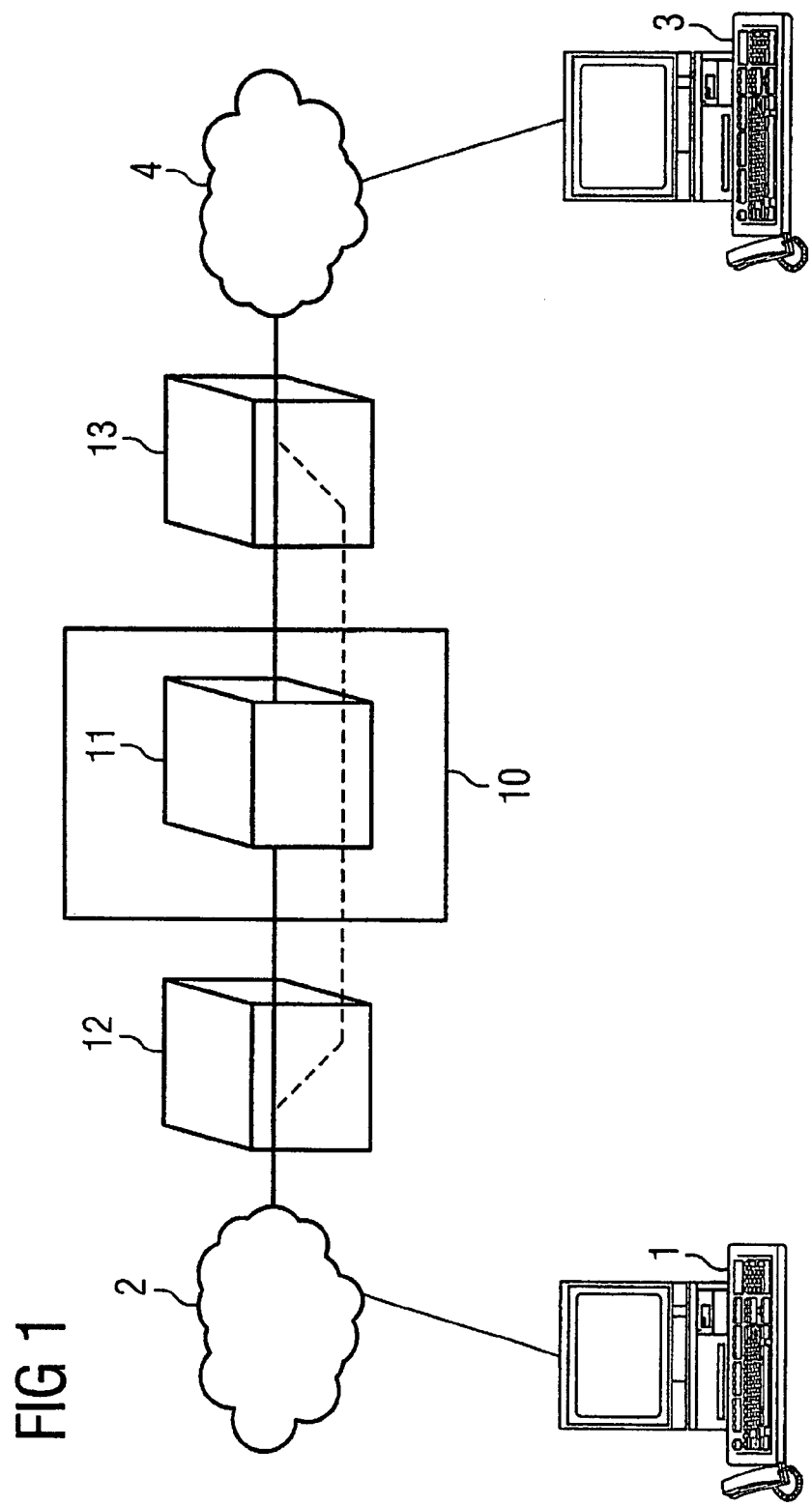
FIG. 1 an example of a security system in a form of embodiment of the invention, FIG. 2 a example of a first proxy, and FIG. 3 an example of a second proxy.

FIG. 1 shows an example of a security system in a form of embodiment of the invention. In this exemplary embodiment a subscriber would like to set up a connection via a first communication device 1 which is connected to the public data network 2, for example the Internet, to a second communication device 3 which is connected to a local data network. In the connection multimedia data, consisting of voice and/or video data and associated information data, is transmitted for example. The network infrastructure is based on an Internet protocol, for example in accordance with the H.323 standard or an SIP standard. The local data network 4 is connected via a security system 10 consisting of a security device 11, especially a firewall, of a first proxy 12 and a second proxy 13 to the public data network 2. The first proxy 12, if viewed from the second communication device 3, is located behind the security device 11 and the second proxy 13 in front of the security device.

A multimedia data stream directed from the public data network 2 to the second communication device 3 is comprehensively filtered in the first proxy 12 so that information data is selected from voice and/or video data. Subsequently only the information data is sent to the security device 11.

The security checking of the information data undertaken within the security device 11 is hardware-based and uses a processor, especially a Digital Signal Processor (DSP). In a further exemplary embodiment the security checking is also undertaken by an algorithm running on a processor. An advantage of this software-based security checking lies in the fact that constantly updated programs, especially virus checking programs, can be stored in a database to which the processor has access. This means that the latest viruses can be detected and filtered out.

The voice and/or video data are transmitted to the second proxy 13, bypassing the security device 11. The security-checked information data is also transmitted by the security device 11 to the second proxy 13 and is then merged with the voice and/or video data, so that the original multimedia data stream is present at the output of the second proxy 13, and this data stream is then transmitted over the local data network 4 to the second communication device 3.

This means that the communication devices 1 and 3 continue to be in a position to establish a mutual VoIP connection without any problems and transparently. So if the first communication device 1 wishes to establish a connection to the second communication device 3, the first proxy 12 recognize this from the Internet protocol (e.g. H.323 or SIP) that there is a request to establish a connection. The data required for this is routed to the security device 11 via a port explicitly enabled for this purpose beforehand. The second proxy 13 routes the voice and/or video data back with the previous IP data stream into the local data network 4. In this case the second proxy 13 keeps the communication data stored so that the second proxy 13, on response to the connection request from the second communication device 3 to the first communication device 1 immediately detects the voice and/or video data and can also direct it via a defined port to the security device 11 from the local data network 4.

The procedure would be the same if a connection were to be set up via the second communication device 3 to the first communication device. The second proxy 13 would again recognize this connection set up and the first proxy 12 would take over the corresponding function for a smooth connection set up to the first communication device 1.

Figure 2:
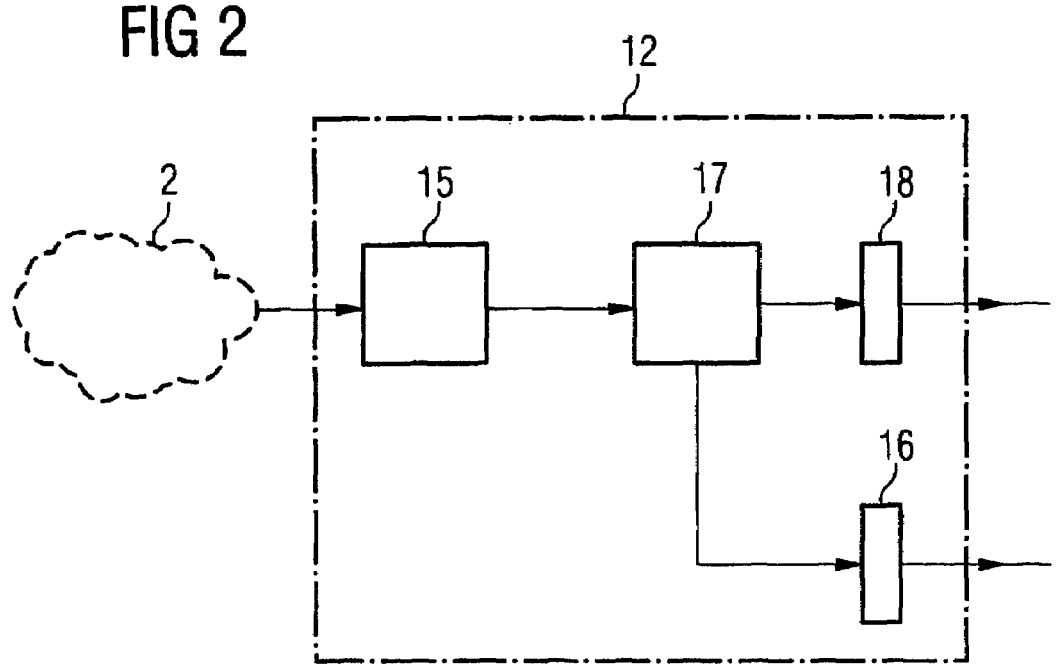

FIG. 2 shows an exemplary embodiment of the first proxy 12 in a form of embodiment of the invention. The data packets originating from the public data network 2 will be transmitted to a receive device 15 located within the first proxy 12 and transmitted on to a selection device 17. This device selects the information data contained within the data from the voice and/or video data and transmits the information data to a first send device 16 and the voice and/or video data to a second send device 18. The first send device 16 transfers the information data to the firewall 11, the second send device 18 transfers the voice and/or video data, bypassing the firewall 11, to the second proxy 13.

Figure 3:
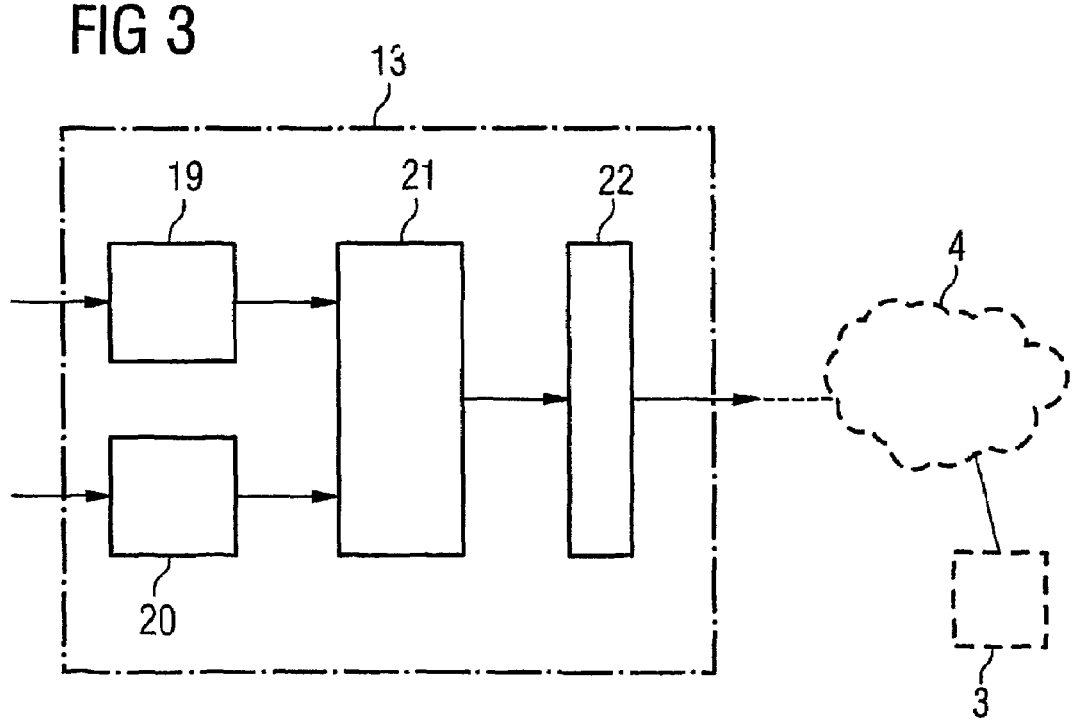

FIG. 3 shows an example of a second proxy 13 in a form of embodiment of the invention. The security-checked information data received from the firewall 11 are received by a first receive device 19 and the voice and/or video data transmitted from the first proxy 12 are received by a second receive device 20 and transmitted to an assembly device arranged within the second proxy 13. This device reassembles the voice and/or video data and the information data into the original multimedia data stream. In doing so it uses the additional information contained in the headers of the IP packets to generate the correct order for the packets. The data is subsequently transmitted by a third send device 22 into the local data network 4 and via this device reaches the second communication device 3.

The execution of the invention is not restricted to the examples and highlighted aspects mentioned above, but is also possible within the framework of the claims in a plurality of variations which lie within the framework of normal activity.

The invention claimed is:

1. A method for packet oriented transmission of data over a data network, comprising:
   connecting a sending communication device to a receiving communication devices over the network, the sending and receiving devices adapted to transmit speech and/or video related data;
   transmitting unauthorized access information from the sending communication device to a security device; and
   transmitting the speech and/or video data to from the sending communication device to the receiving communication device, the data transmission bypassing the security device.

2. The method in accordance with claim 1, wherein a selection device is arranged within a first proxy.

3. The method in accordance with claim 2, wherein a security check is made on the data transmitted from the first proxy to the security device, the security-checked data transmitted to an assembly device arranged within a second proxy, the voice and/or video data transmitted directly from the first proxy to the assembly device, and the voice and/or video data and the information data reassembled within the assembly device into the original data and the data transmitted to the second communication device.

4. The method in accordance with claim 1, wherein the data network is a communication system in accordance with a H.323 standard for transmission of VoIP data and the security device is a firewall.

5. The method in accordance with claim 1, wherein the data network is a multimedia communication system in accordance with a SIP standard.

6. The method in accordance with claim 1, wherein the data is constructed in accordance with an RTP standard.

7. The method in accordance with claim 2, wherein at least one data channel between the security device and the proxy is embodied as an authenticated channel for exclusive use by authorized subscribers in order to protect against unauthorized access.

8. The method in accordance with claim 2, wherein the information data transmitted between the security device and the proxy is transmitted encrypted for protection against unauthorized access.

9. The method in accordance with claim 2, wherein the proxy is embodied with a packet filter functionality to protect against unauthorized access.

10. A proxy for executing a method for packet oriented transmission of data over a data network, comprising:
    a first receive device for receiving the data from a public data network;
    a selection device connected to the first receive device for selecting a set of information data within a set of voice and/or video data;
    a first send device for transmitting the information data to the security device; and
    a second send device for transmitting the voice and/or video data to the proxy.

11. The proxy in accordance with claim 10, further comprising a second receive device to receive the security-checked information data from the security device and a third receive device to receive the voice and/or video data received from the proxy, an assembly device linked to the second receive device and the third receive device for assembling the data for the original data and a third send device for transmitting the assembled data to the communication device.

* * * * *